United States Patent Office 2,720,196
Patented Oct. 11, 1955

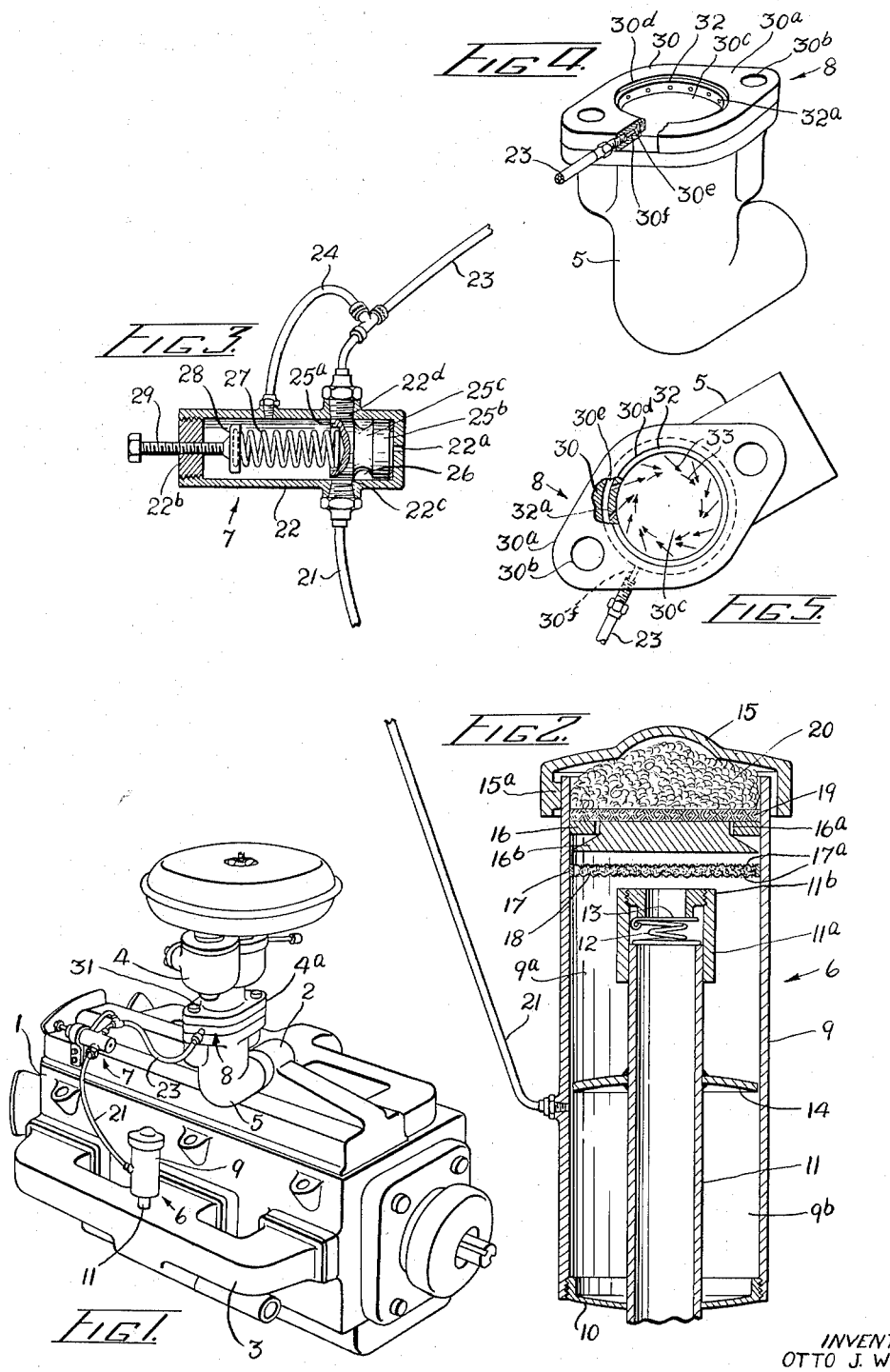

2,720,196

APPARATUS FOR ADMITTING FLUID MATERIALS TO MANIFOLDS OF INTERNAL COMBUSTION ENGINES

Otto John Wolf, Toronto, Ontario, Canada

Application August 19, 1952, Serial No. 305,222

26 Claims. (Cl. 123—119)

This invention relates to apparatus for admitting fluid materials to the intake and exhaust means of internal combustion engines.

It is known that during the operation of an internal combustion engine variations in pressure occur in the exhaust manifold, and while the pressure in the exhaust manifold is generally greater than atmospheric, forcing the exhaust gases out of the exhaust pipe, nevertheless there are intervals, when the exhaust valves are open, during which the pressure in the exhaust manifold is less than atmospheric so that there is a tendency to draw part of the exhaust gases back into the cylinder: these intervals of low pressure occur due to the rapid outrush of exhaust gases, causing partial vacuum in the exhaust manifold, and are also due to the existence of a period of overlap in the valve operation of each cylinder, when both the exhaust valve and the intake valve are open.

Exhaust gases which are not purged from a cylinder during the exhaust stroke, or which are drawn into the cylinder during the intervals of low pressure, reduce the efficiency of the engine and are largely responsible for the formation of carbon in the cylinder.

It has been proposed heretofore to provide on the exhaust manifold a check valve which opens to the atmosphere during the intervals of low pressure, so that air rather than exhaust gases is drawn into the cylinders of the engine. See, for example, U. S. Patent No. 2,482,754 to C. R. Flint. It is an object of the invention to provide improved means for admitting air and other materials into the exhaust manifold.

It has also been proposed heretofore to provide valve-controlled means for admitting air to the intake manifold of an internal combustion engine to economize on the consumption of fuel. It is a further object of the invention to provide improved means for admitting air and other materials into the intake manifold.

In the drawings which illustrate the invention and in which like reference characters designate like parts:

Fig. 1 is a perspective of an automobile engine on which apparatus constructed according to the invention is mounted;

Fig. 2 is a longitudinal section of the aspirator of the apparatus shown in Fig. 1;

Fig. 3 is a longitudinal section of the diffuser control valve of the apparatus shown in Fig. 1;

Fig. 4 is a perspective of the diffuser of the apparatus shown in Fig. 1 and of the pipe coupling between the carburetor and the intake manifold of the engine; and Fig. 5 is a plan of the diffuser and pipe coupling shown in Fig. 4.

The internal combustion engine shown in Fig. 1 has a cylinder block 1, an intake manifold 2, an exhaust manifold 3, a carburetor 4, and a pipe coupling 5 between the carburetor and the intake manifold. Apparatus mounted on the engine and constructed according to the invention includes, in the embodiment illustrated, an aspirator 6 mounted on the exhaust manifold 3, a diffuser control valve 7 mounted on the cylinder block 1, and a diffuser 8 mounted between the carburetor 4 and the pipe coupling 5. For an engine having more than one exhaust manifold, an aspirator 6 is mounted on each exhaust manifold.

The aspirator 6 consists of a cylindrical container 9 which is closed at the lower end by an inverted cap 10. A tube 11 extends through the central portion of the cap into the container 9. The tube 11 is threaded at its lower end; to mount the aspirator on the exhaust manifold 3 the lower end of the tube 11 is screwed into a tapped hole in the exhaust manifold, so that the tube communicates with the interior of the exhaust manifold. Secured to and extending beyond the upper end of the tube 11 is a sleeve 11a supporting a tubular nipple 11b which is spaced from the upper end of the tube 11 and is aligned with the tube. Between the upper end of the tube 11 and the nipple 11b is a coil spring 12, the lower end of which is secured to the upper end of the tube 11 and the upper end of which is secured to one edge of a check valve 13 which normally closes the lower end of the nipple. Surrounding the tube 11 below the sleeve 11a is a baffle 14 having a convex upper surface; the baffle divides the container 9 into an upper chamber 9a and a lower chamber 9b. The edges of the baffle clear the inner surface of the cylinder by say two thousandths of an inch, which is sufficient to permit condensate in the upper chamber 9a to fall into the lower chamber 9b.

At the upper end of the container 9 is a cap 15 which is pressed on to the container and grips the container by means of a plurality of lugs 15a. The lugs 15a space the cap 15 from the container so that air may be drawn into the upper end of the container. Fitting tightly within the container 9 below its upper end is a plug 16 having a plurality of small openings 16a spaced apart from one another on a circle coaxial with the container 9; on its lower surface the plug 16 has an outwardly flaring frusto-conical projection 16b, the base of which clears the inner surface of the container 9 by say four thousandths of an inch.

Below the plug 16 and also fitting tightly within the container 9 is a capsule consisting of a ring 17 having screens 17a secured across its upper and lower ends; the screens and the ring enclose filter material 18 such as wood shavings or felt. Before insertion in the capsule, the filter material 18 is preferably saturated with a deliquescent cleaning agent, such as sal ammoniac or blue vitriol, and then dried.

Immediately above the plug 16 is an air filter 19 of fine, compressed material such as metallic shavings, and above the filter 19 is another filter 20 of coarser material such as wire or machine trimmings.

A copper tube 21 connects the container 9, below the baffle 14, to the diffuser control valve 7. The control valve 7 consists of a cylinder 22 which is closed at one end, save for a vent 22a, and closed at the other end by a plug 22b. The cylinder has an inlet 22c at one side connected to the tube 21, and has an outlet 22d opposite the inlet and connected to a tube 23 which leads to the diffuser 8. A bleeder tube 24 connects the tube 23 to the interior of the cylinder 22 between the outlet 22d and the plug 22b. Slidable in the cylinder 22 is a piston having end portions 25a and 25b which fit snugly against the cylinder wall. Between the end portions 25a and 25b the piston has a reduced neck portion 25c so that an annular passage 26 is formed between the piston and the cylinder 22. A spring 27 is in compression between the end portion 25a and a socket 28 mounted on a stud 29. The stud 29 is threaded through the plug 22b, and its axial position can thus be adjusted to obtain the desired compression of the spring 27. The spring urges the piston towards the vent 22a.

As shown in Figs. 4 and 5 the diffuser 8 includes a supporting ring 30, and the supporting ring has wings 30a having holes 30b which are aligned with similar holes in the pipe coupling 5 and in the mounting 4a of the carburetor (Fig. 1). Studs 31 passing through the aligned holes secure the diffuser between the carburetor 4 and the coupling 5. Through the supporting ring 30 is a central passage 30c bordered by a cylindrical wall 30d of the supporting ring. Fitting tightly against the wall 30d is a diffuser ring 32, and the wall 30d is recessed behind the diffuser ring to form an annualr passage 30e. The tube 23 communicates with the passage 30e through a radial opening 30f in the ring 30. The diffuser ring has a plurality of identical openings 32a equally spaced around the central passage 30c; the openings are so disposed that their axes when produced are tangential to an imaginary circle concentric with the diffuser ring and of smaller diameter than the diffuser ring.

*Operation*

When the pressure in the exhaust manifold 3 falls below the pressure in the upper chamber 9a of the aspirator 6, the check valve 13 opens with a pivotal movement about the edge to which the spring 12 is secured. Air is drawn under the cap 15 into the upper end of the container 9, through the filters 20 and 19 and the openings 16a, between the projection 16b and the inner surface of the container 9, through the screens 17a and the filter material 18, past the valve 13, down the tube 11, into the exhaust manifold and thence into the cylinders of the engine. Due to this admission of air the amount of exhaust gases which are drawn back into the cylinders from the exhaust system is greatly reduced. The air promotes combustion and cools the cylinders; engine efficiency is improved and the formation of carbon is reduced.

When the pressure in the exhaust manifold rises above the pressure in the chamber 9a the check valve 13 closes, but not before some of the exhaust gases in the manifold have entered the chamber 9a: since the spring 12 acts at only one edge of the valve 13, the closing of the valve at its other edge is somewhat sluggish. The hot exhaust gases in the chamber 9a meet the relatively cool air which was drawn into the container, and come into contact with the relatively cool walls of the container and therefore condense. The condensed exhaust products fall into the lower chamber 9b. Some of the condensed exhaust products is deposited in the filter material 18, particularly when a deliquescent substance is provided in the filter material.

The plug 16 prevents escape of the exhaust gases before they condense: if desired, a check valve can be used instead of the plug 16, but in time a check valve requires adjustment and repairs. The frusto-conical projection 16b of the plug provides a venturi passage for the incoming air between the projection and the wall of the container 9, and in addition the chamber 9a is subjected to repeated suction as the valve 13 opens, so that the pressure in the chamber 9a is below atmospheric. Thus the air entering the chamber 9a expands, and moisture in the incoming air condenses, some of this moisture being deposited in the filter material 18. When the filter material and any deliquescent substance that it contains become saturated, liquid drips from the capsule to the lower chamber 9b.

The lower chamber 9b is adjacent the exhaust manifold 3 and is therefore comparatively warm; the inverted cap 10 at the lower end is hot when the engine has been operating for a while. Thus, air passing down the tube 11 is warmed and expands, creating a good down-draft without seriously affecting the value of the air as a coolant.

Because of the heat in the lower chamber 9b, condensed exhaust products and moisture which fall into the chamber are vapourized and super-heated, and, if the piston of the control valve 7 is properly positioned, the vapourized products and superheated steam flow through the tubes 21 and 23 to the diffuser 8 and thence to the intake manifold. Due to changing pressures in the chambers 9a and 9b, some of the vapourized materials in the lower chamber 9b escape into the upper chamber 9a and are drawn into the exhaust manifold; on the other hand, some air is drawn into the intake manifold, the air passing through the opening between the baffle 14 and the wall of the container 9 and thence into the tube 21. The presence of superheated steam in the products which are drawn into the cylinders has been found to improve performance markedly. Where a cleaning agent such as sal ammoniac is provided in the filter material 18, some of the cleaning agent is carried into the lower chamber 9b by the liquid which drips from the filter material, and the cleaning agent thus finds its way into the intake and exhaust manifolds and the cylinders.

With the piston of the control valve 7 in the position shown in Fig. 3, the end portion 25a blocks the inlet 22c and the outlet 22d and therefore prevents flow of vapourized exhaust products, air, etc. through the tubes 21 and 23. If the piston is moved slightly to the left as viewed in Fig. 3, the annular passage 26 connects the inlet 22c to the outlet 22d and flow of fluid materials to the intake manifold is permitted. If the piston is moved still farther to the left, the end portion 25b again blocks the inlet 22c and the outlet 22d.

The position of the piston is controlled by the pressure in the intake manifold, this pressure being transmitted to the interior of the cylinder 22 through the openings 32a, the passage 30e, the opening 30f, the tube 23 and the bleeder 24. Thus, when there is a "low vacuum" in the intake manifold (zero to eight inches of mercury in a typical case), the piston is in the position shown and the control valve 7 is closed, the end portion 25a preventing injection of fluid materials via the diffuser 8. Similarly when there is a "high vacuum" (eighteen inches of mercury or more), the control valve 7 is again closed, the end portion 25b preventing injection via the diffuser. In the intermediate range the control valve 7 is open and permits injection, the fullest injection occurring with a vacuum of about eleven to fourteen inches of mercury.

When fluid materials are injected into the intake, the air-fuel ratio of the engine is increased by ten percent or more when the control valve 7 is fully open. This is desirable in, say, an automobile which is cruising at thirty to sixty M. P. H. (eleven to seventeen inches vacuum) since a considerable economy in fuel consumption is achieved. However, at low vacuums, which occur during acceleration or at speeds in excess of sixty M. P. H., a lower air-fuel ratio is required and the diffuser control valve 7 closes, obstructing the passage of air and vapourized exhaust products to the diffuser 8. Similarly when the engine is idling, the vacuum in the intake is high but the engine is receiving little fuel, and the control valve 7 prevents injection via the diffuser 8. Thus the control valve provides desired metering of fluid materials to the diffuser 8.

The fluid mixture which passes to the diffuser 8 enters the opening 30f and passes around the annular passage 30e, entering the intake passage 30c through the openings 32a. The paths taken by the mixture on entering the intake passage 30c are indicated by arrows 33 in Fig. 5; following these paths, the mixture causes a uniform swirling movement of all materials which pass into the intake manifold, whether from the diffuser 8 or from the carburetor 4. The swirling movement causes thorough mixing of the air and fuel coming from the carburetor, and increases the atomization of the fuel. Since the materials which are injected into the intake from the diffuser 8 are warm, they heat the mixture flowing to the cylinders so that more complete combustion occurs in the cylinders. As mentioned previously, the injected materials increase the air-fuel ratio, reducing the consumption of fuel. Furthermore the injected materials appear to act as catalysts, assisting the combustion of the fuel. The composition of the injected materials has not as yet been completely determined, but it is known that there is air, moisture and some unburnt fuel recovered from the exhaust, together with some of the cleaning agent from the capsule in the aspirator.

When the apparatus has been in operation for a short period, the cylinders and exhaust pipes of the engine are found to be remarkably clean. Corrosion in the exhaust system ceases. Carbon knock and detonation in the engine is eliminated. Furthermore if the spark is advanced from five to nine degrees for greater horsepower and fuel economy it is found that pre-ignition knock does not occur. Engine operation is cooler and smoother.

The embodiments of the invention herewith shown and described are to be taken as preferred examples of the same, and various changes in the shape, size and arrangement of parts may be resorted to without departing from the spirit of the invention or the scope of the subjoined claims.

What I claim as my invention is:

1. For an internal combustion engine having intake means for the supply of fuel and exhaust means for the discharge of exhaust products, apparatus providing a vent for the escape of exhaust products from the exhaust means, means external of the intake and exhaust means for condensing the escaping exhaust products and for subsequently vapourizing the condensed exhaust products, and means for conducting the vapourized exhaust products to the intake means of the engine.

2. For an internal combustion engine having intake means for the supply of fuel and exhaust means for the discharge of exhaust products, apparatus comprising means for condensing exhaust products from the exhaust means and including a chamber for the collection of the condensed exhaust products, the chamber being adapted to be heated whereby the condensed exhaust products are vapourized, and means for connecting the chamber with the intake means of the engine whereby the vapourized exhaust products are admitted to the intake means.

3. For an internal combustion engine having intake means for the supply of fuel and exhaust means for the discharge of exhaust products, apparatus providing a first and a second chamber, means for connecting the first chamber to the exhaust means for the collection of exhaust products in the first chamber, the first chamber being sufficiently unaffected by heat from the exhaust means that the exhaust products cool and condense in the first chamber, the first and second chambers being in communication with each other whereby the condensed exhaust products can enter the second chamber, the second chamber being adapted to be heated whereby the condensed exhaust products are vapourized, and means for connecting the second chamber with the intake means of the engine whereby the vapourized exhaust products are admitted to the intake means.

4. For an internal combustion engine having intake means for the supply of fuel and exhaust means for the discharge of exhaust products, apparatus comprising a container adapted to be connected to the exhaust means for the collection of exhaust products, the container when connected to the exhaust means having a lower portion located adjacent the exhaust means and heated thereby and also having a relatively cool upper portion remote from the exhaust means whereby the collected exhaust products are condensed in the upper portion and fall to the lower portion where they are vapourized, and means for connecting the lower portion with the intake means of the engine whereby the vapourized exhaust products are admitted to the intake means.

5. For an internal combustion engine having intake means for the supply of fuel and exhaust means for the discharge of exhaust products, apparatus comprising means for condensing exhaust products from the exhaust means and a chamber for the collection of the condensed exhaust products, the chamber having an opening for the admission of air to the chamber, the chamber being adapted to be heated whereby the condensed exhaust products are vapourized, and means for connecting the chamber with the intake means of the engine whereby the vapourized exhaust products and air are admitted to the intake means.

6. For an internal combustion engine having intake means for the supply of fuel and exhaust means for the discharge of exhaust products, apparatus providing a first and a second chamber, the first chamber having an opening for the admission of air to the first chamber, a conduit extending through the second chamber and having one end in the first chamber and adapted to be connected at its other end to the exhaust means, valve means in the conduit for admitting air from the first chamber through the conduit to the exhaust means and for permitting exhaust products to be collected in the first chamber, the first chamber being relatively cool as compared to the exhaust means whereby the collected exhaust products are condensed, the first and second chambers being in communication with each other whereby the condensed exhaust products can enter the second chamber, the second chamber being adapted to be heated whereby the condensed exhaust products are vapourized and the air which is admitted through the conduit to the exhaust means is warmed, and means for connecting the second chamber with the intake means of the engine whereby the vapourized exhaust products are admitted to the intake means.

7. For an internal combustion engine having intake means for the supply of fuel and exhaust means for the discharge of exhaust products, apparatus providing a vent for the escape of exhaust products from the exhaust means and for the admission of air to the exhaust means, means external of the intake and exhaust means for condensing the escaping exhaust products and for subsequently vapourizing the condensed exhaust products, and means for conducting the vapourized exhaust products to the intake means of the engine.

8. For an internal combustion engine having intake means for the supply of fuel and exhaust means for the discharge of exhaust products, apparatus comprising means for condensing exhaust products from the exhaust means and for condensing moisture from atmospheric air, and a chamber for the collection of the condensed exhaust products and moisture, the chamber being adapted to be heated whereby the condensed exhaust products and moisture are vapourized, and means for connecting the chamber with the intake means of the engine whereby the vapourized exhaust products and moisture are admitted to the intake means.

9. For an internal combustion engine having intake means for the supply of fuel, apparatus comprising means for condensing moisture from atmospheric air and a chamber for the collection of the condensed moisture, the chamber being adapted to be heated whereby the condensed moisture is vapourized, and means for connecting the chamber with the intake means of the engine whereby the vapourized moisture is admitted to the intake means.

10. For an internal combustion engine having intake means for the supply of fuel and exhaust means for the discharge of exhaust products, apparatus providing a vent for the escape of exhaust products from the exhaust means and for the admission of air to the exhaust means, means external of the intake and exhaust means in communication with the vent for condensing the escaping exhaust products and moisture from atmospheric air and for subsequently vapourizing the condensed exhaust products and moisture, and means for conducting the vapourized exhaust products and moisture to the intake means of the engine.

11. For an internal combustion engine having intake means for the supply of fuel and exhaust means for the discharge of exhaust products, apparatus comprising means for condensing exhaust products from the exhaust means to form a condensate, a chamber for the collection of the condensate, the chamber being adapted to be heated whereby the condensate is vapourized and means for conducting the vapourized condensate to at least one of the intake means and the exhaust means.

12. For an internal combustion engine having intake means for the supply of fuel and exhaust means for the discharge of exhaust products, apparatus comprising means for condensing exhaust products from the exhaust means to form a condensate, condensate collecting means, said collecting means including a chamber in which the condensate is vapourized, a cleaning agent in the collecting means, the cleaning agent being soluble in the condensate, and means for conducting the vapourized condensate to at least one of the intake means and the exhaust means, the vapourized condensate carrying the cleaning agent with it.

13. For an internal combustion engine having intake means for the supply of fuel and exhaust means for the discharge of exhaust products, apparatus comprising means for condensing moisture from atmospheric air, means for collecting the condensed moisture, said collecting means including a chamber in which the condensed moisture is vapourized, a cleaning agent in the collecting means, the cleaning agent being soluble in the condensed moisture, and means for conducting the vapourized moisture to at least one of the intake means and the exhaust means, the vapourized moisture carrying the cleaning agent with it.

14. For an internal combustion engine having intake means for the supply of fuel and exhaust means for the discharge of exhaust products, apparatus comprising means for condensing exhaust products from the exhaust means and moisture from atmospheric air to form a condensate, condensate collecting means, said collecting means including a capsule, a cleaning agent in the capsule, the cleaning agent being soluble in the condensate, and a chamber for the collection and vapourization of condensate, the chamber being disposed so as to receive condensate from the capsule, and means for conducting the vapourized condensate to at least one of the intake means and the exhaust means.

15. For an internal combustion engine having intake means for the supply of fuel and exhaust means for the discharge of exhaust products, apparatus providing a first chamber and a second chamber, the first chamber having an opening for the admission of air, means for connecting the first chamber to the exhaust means and including valve means for admitting air from the first chamber to the exhaust means and for permitting exhaust products to be collected in the first chamber where they condense, a quantity of deliquescent material in the first chamber and located between the opening for the admission of air and the valve means, the first and second chambers being in communication with each other whereby the condensed exhaust products can enter the second chamber, the second chamber being adapted to be heated whereby the condensed exhaust products are vapourized, and means for connecting the second chamber with the intake means of the engine whereby the vapourized exhaust products are admitted to the intake means.

16. For an internal combustion engine having intake means for the supply of fuel and exhaust means for the discharge of exhaust products, apparatus comprising a container, the container having an opening for the admission of air to the container, means for connecting the container to the exhaust means and including valve means for admitting air from the container to the exhaust means and for permitting exhaust products to be collected in the container when connected to the exhaust means having a lower portion located adjacent the exhaust means and heated thereby and also having a relatively cool upper portion remote from the exhaust means whereby the collected exhaust products are condensed in the upper portion and fall to the lower portion where they are vapourized, and means for connecting the lower portion with the intake means of the engine whereby the vapourized exhaust products are admitted to the intake means.

17. For an internal combustion engine having intake means for the supply of fuel and exhaust means for the discharge of exhaust products, apparatus comprising a container, the container having an opening for the admission of air to the container, means for connecting the container to the exhaust means and including valve means for admitting air from the container to the exhaust means and for permitting exhaust products to be collected in the container, the container having a portion sufficiently unaffected by heat from the exhaust means when the container is connected to the exhaust means that exhaust products in that portion cool and condense.

18. For an internal combustion engine having intake means for the supply of fuel and exhaust means for the discharge of exhaust products, apparatus comprising a container, the container having a lower portion and an upper portion separated from the lower portion by a baffle, a conduit extending through the lower portion and having one end in the upper portion, the other end of the conduit being adapted to be connected to the exhaust means whereby the lower portion of the container is located adjacent the exhaust means and is heated thereby and the upper portion of the container is remote from the exhaust means and is relatively cool, the upper portion of the container having an opening for the admission of air to the upper portion, valve means in the conduit for admitting air from the upper portion through the conduit to the exhaust means and for permitting exhaust products to be collected in the upper portion where they are condensed, the condensed products falling past the baffle into the lower portion where they are vapourized, and means for connecting the lower portion with the intake means of the engine whereby the vapourized exhaust products are admitted to the intake means.

19. For an internal combustion engine having intake means for the supply of fuel and exhaust means for the discharge of exhaust products, apparatus comprising means for condensing exhaust products from the exhaust means and including a chamber for the collection of the condensed exhaust products, the chamber being adapted to be heated whereby the condensed exhaust products are vapourized, and means for connecting the chamber with the intake means of the engine whereby the vapourized exhaust products are admitted to the intake means, the last-mentioned means including means for diffusing the vapourized exhaust products into the intake means.

20. For an internal combustion engine having an intake conduit for the supply of fuel and exhaust means for the discharge of exhaust products, apparatus providing a vent for the escape of exhaust products from the exhaust means, means for condensing the escaping exhaust products and for subsequently vapourizing the condensed exhaust products, and means for conducting the vapourized exhaust products to the intake conduit of the engine, the last-mentioned means including a diffuser ring having a plurality of holes spaced around the ring, the ring being adapted to be disposed around the inside of the conduit for directing the vapourized exhaust products into the conduit through the holes.

21. For an internal combustion engine having an intake conduit for the supply of fuel and exhaust means for the discharge of exhaust products, apparatus comprising means for condensing exhaust products from the exhaust means and including a chamber for the collection of condensed exhaust products, the chamber being adapted to be heated whereby the condensed exhaust products are vapourized, and means for connecting the chamber with the intake conduit of the engine whereby the vapourized exhaust products are admitted to the intake conduit, the last-mentioned means including a diffuser ring having a plurality of holes substantially equally spaced around the ring, the ring being adapted to be disposed around the inside of the conduit for directing the vapourized exhaust products into the conduit through the holes, the axes of the holes when projected being substaitnally tangential to an imaginary circle concentric with the diffuser ring but of smaller diameter than the diffuser ring.

22. For an internal combustion engine having an intake conduit for the supply of fuel, means for diffusing gases and vapours into the conduit, comprising a diffuser ring having a plurality of holes substantially equally spaced around the ring, the ring being adapted to be disposed around the inside of the conduit for directing gases and vapours into the conduit through the holes, the axes of the holes when projected being substantially tangential to an imaginary circle concentric with the diffuser ring but of smaller diameter than the diffuser ring.

23. For an internal combustion engine having intake means for the supply of fuel to exhaust means for the discharge of exhaust products, apparatus comprising means for condensing exhaust products from the exhaust means and including a chamber for the collection of the condensed exhaust products, the chamber being adapted to be heated whereby the condensed exhaust products are vapourized, and means for conducting the vapourized exhaust products to the intake means of the engine, the last-mentioned means including a control valve responsive to pressure in the intake means.

24. For an internal combustion engine having intake means for the supply of fuel and exhaust means for the discharge of exhaust products, apparatus providing a vent for the escape of exhaust products from the exhaust means, means for condensing the escaping exhaust products and for subsequently vapourizing the condensed exhaust products, and means for conducting the vapourized exhaust products to the intake means of the engine, the last-mentioned means including a control valve responsive to pressure in the intake means, the valve closing at low and high pressures in the intake means and opening at intermediate pressures.

25. For an internal combustion engine having intake means for the supply of fuel and exhaust means for the discharge of exhaust products, apparatus comprising means for condensing exhaust products from the exhaust means and including a chamber for the collection of the condensed exhaust products, the chamber being adapted to be heated whereby the condensed exhaust products are vapourized, and means for conducting the vapourized exhaust products to the intake means of the engine, the last-mentioned means including a control valve, the control valve comprising a cylinder having an inlet port and an outlet port for communication with the intake means, a piston movable in the cylinder and adapted to close at least one of the ports, and means for connecting the cylinder to the intake means whereby the piston moves in response to pressure in the intake means.

26. For an internal combustion engine having intake means for the supply of fuel and exhaust means for the discharge of exhaust products, in combination, means for collecting exhaust products from the exhaust means, and a control valve for admitting exhaust products from the collecting means into the intake means, the control valve comprising a cylinder having an inlet port for communication with the collecting means and an outlet port for communication with the intake means, a piston movable in the cylinder and adapted to close at least one of the ports, and means for connecting the cylinder to the intake means whereby the piston moves in response to pressure in the intake means.

References Cited in the file of this patent

UNITED STATES PATENTS

| | | |
|---|---|---|
| 1,099,445 | Jaubert | June 9, 1914 |
| 1,138,581 | Shumaker | May 4, 1915 |
| 1,271,541 | Core et al. | July 9, 1918 |
| 1,309,114 | Black | July 8, 1919 |
| 1,961,444 | Lewis | June 5, 1934 |